July 2, 1935.  H. WACH  2,007,032
COMBINED RECIPROCATING ENGINE AND TURBINE
Filed April 6, 1926
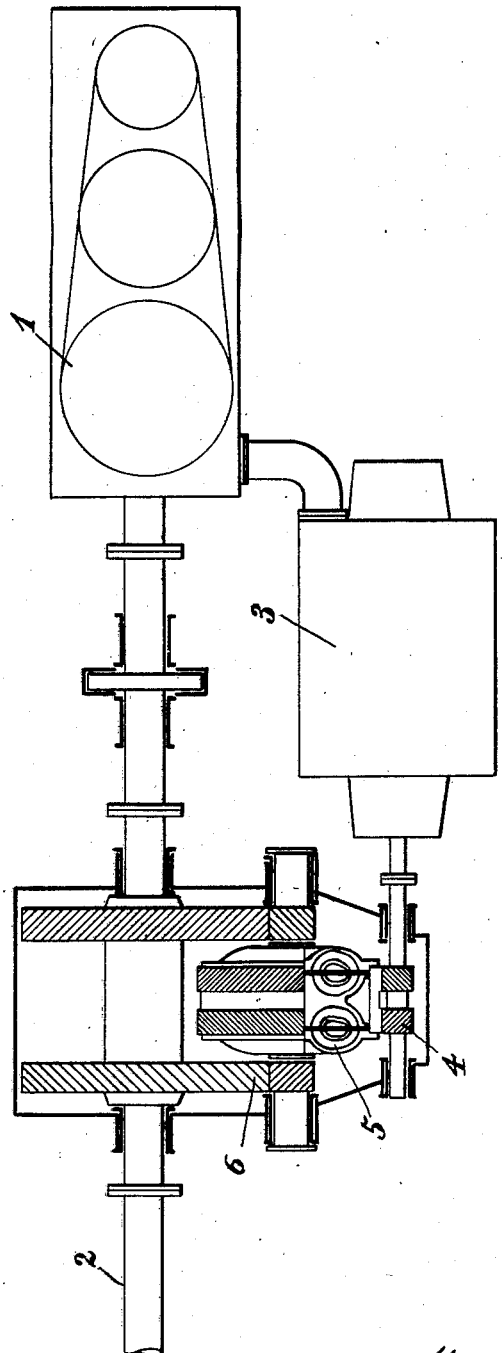
Inventor:
Hans Wach
By
Atty.

UNITED STATES PATENT OFFICE 2,007,032

COMBINED RECIPROCATING ENGINE AND TURBINE

Hans Wach, Wesermunde-Lehe, Germany

Application April 6, 1926, Serial No. 100,069
In Germany July 24, 1925

3 Claims. (Cl. 60—21)

My invention relates to reciprocating steam engines and more especially consists in a combined reciprocating steam engine and exhaust-steam turbine receiving its steam from the reciprocating engine.

According to the present invention, the turbine is so arranged as to act upon the shaft of the reciprocating engine through a fluid transmission gear, whereby considerable advantages are obtained, especially in ship propulsion with the use of a single screw propeller shaft. While the reciprocating engine as before exerts its whole power upon the screw propeller, the turbine constitutes an additional source of power, and as this power is transmitted to the propeller shaft through the medium of a fluid transmission gear, the excess driving force of the reciprocating engine, under certain conditions, is imparted through the fluid transmission gear to the turbine and the driving gear, whereby a racing of the engine is prevented, while the power thus stored in the fluid transmission gear is utilized for the propulsion of the vessel.

The invention is illustrated in the accompanying drawing.

1 is the reciprocating steam engine acting upon the screw propeller shaft 2 of a sea-going vessel. The exhaust steam from the engine is utilized in the exhaust-steam turbine 3. The latter also imparts its power through a driving gear 4, a fluid transmission gear 5, and a driving gear 6 to the propeller shaft 2.

Through the fluid transmission 5 the uneven rotary momentum of the reciprocating engine 1 is equalized in relation to the turbine 3, because the fluid transmission comprising two elements, to wit, a primary part and a secondary part, not rigidly connected permits slippage between the reciprocating engine and the turbine. While the engine transmits the greatest part of its energy direct i. e. without loss of power, to the propeller shaft 2, the additional energy of the turbine 3 acts through the fluid transmission gear and the driving gear upon the propeller shaft. The fluid transmission gear comprises several parts not rigidly connected, to wit, a primary part, acting as a bucket-wheel and a secondary part. The fluid under pressure supplied to this coupling is accelerated by the bucket-shaped primary part and transmits its energy to the secondary part acting like a turbine-wheel, which returns the fluid to the primary part, whereby the fluid is again accelerated. Thereby an elastic transmission gear is produced. The dimensions and therefore the cost and the requirements as to space for the engine installation are comparatively small.

The invention is of course also applicable to stationary installations.

I wish it to be understood that I do not limit myself to the exact details of construction shown and described, since my invention is capable of various modifications lying within its scope.

I claim:—

1. Means for driving a rotary shaft comprising a reciprocating engine direct connected with said shaft, a turbine engine, a fluid power transmitting device, reduced speed gearing between said turbine engine and one portion of said device, and reduced speed gearing between another portion of said device and said shaft.

2. Means for driving a rotary shaft comprising a reciprocating engine direct connected with said shaft, a turbine engine, a fluid power transmitting device, a driving connection between said turbine engine and one portion of said device, and reduced speed gearing between another portion of said device and said shaft.

3. Means for driving a rotary shaft comprising a reciprocating engine direct connected with said shaft, a turbine engine, a fluid power transmitting device, reduced speed gearing between said turbine engine and one portion of said device, and a driving connection between another portion of said device and said shaft.

HANS WACH.